United States Patent [19]

Siminovich

[11] 4,216,792

[45] Aug. 12, 1980

[54] PROPORTIONER OF LIQUIDS

[75] Inventor: Samuel Siminovich, Buenos Aires, Argentina

[73] Assignee: Araley, S.A., Buenos Aires, Argentina

[21] Appl. No.: 966,334

[22] Filed: Dec. 4, 1978

[30] Foreign Application Priority Data

Apr. 26, 1978 [AR] Argentina .............................. 271903

[51] Int. Cl.² ............................................. B67D 1/04
[52] U.S. Cl. ..................................... 137/209; 137/577
[58] Field of Search ............... 137/209, 577; 222/394, 222/398

[56] References Cited
U.S. PATENT DOCUMENTS 466,336  1/1892  Franklin ........................... 137/577 X
2,782,016  2/1957  Inannelli .......................... 137/209 X Primary Examiner—Alan Cohan
Attorney, Agent, or Firm—Haseltine, Lake & Waters

[57] ABSTRACT

A hermetically closed vessel is provided in its top portion with a liquid feed line provided with a check valve and another valve controlled by a float; a compressed air feed line provided with a solenoid valve to control the input of air; and a liquid discharge line extending almost to the bottom of the vessel. A branch located about mid-height in the liquid discharge line is connected to a flexible tube having an open free end attached to a means for regulating the height of the free end. This arrangment allows for the amount of liquid to be ejected to be precisely controlled by the height of the free end of the flexible tube.

2 Claims, 1 Drawing Figure

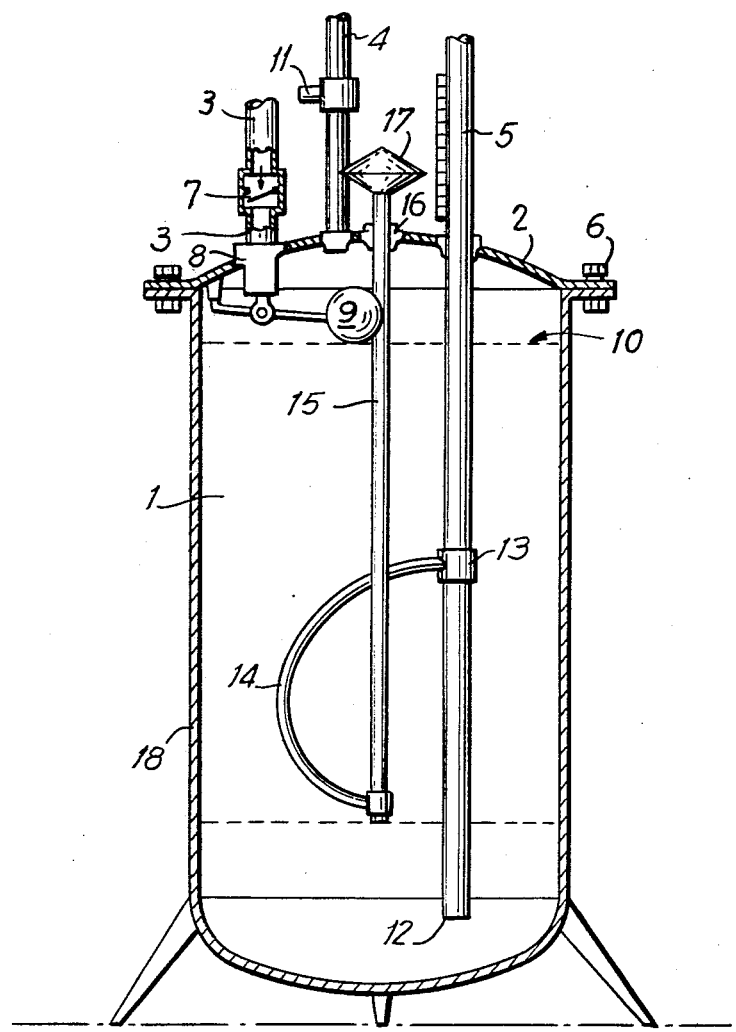

PROPORTIONER OF LIQUIDS

SUMMARY OF THE INVENTION

The present invention has as its main object a proportioner of liquids suitable for a variety of applications, notably that of regulating flows of water to be used for cooling roasted coffee.

More concretely, the present invention covers a device of the kind specified and which affords the advantage of being able to elect at will and with perfect precision the quantity of water which impelled under pressure, must be ejected in a given period of time and for a purpose which, among others, may be that of cooling a product during a thermal treatment.

The device of the present invention satisfactorily solves a problem which is very common in the industry, as for example, the controlled and quick cooling of the coffee when it is roasted, in order that the temperature thereof will drop rapidly after the optimum roasting level has been reached.

In fact, in such cases it is usually indispensable that the quantity of water ejected onto the product being treated must be perfectly controlled and also its pressure must be of a given value, which requirements are normally difficult to fulfill when using running water or water from pipes which also serve other needs, since very often the pressure varies and this directly affects the amount of flow per unit time, and conversely, to obtain given quantities of water from such pipes does not always take the same amount of time.

With the device of this invention it is possible to select at will the quantity of water to be ejected onto the coffee being roasted, for cooling it, as well as the water pressure, all of which is a direct result of the particular combination of means that constitute the device, as it comprises a vessel hermetically closed and preferably enlarged in vertical direction; in its top or upper zone are three conduits, namely a water feed line, provided with a check valve and another valve controlled by a float; a compressed air feed line, provided with a solenoid valve whereby the injection of pressure is controlled as a function of the requirements relating to the product under treatment; and thirdly a pressure discharge line for feeding atomizer nozzles or other ejectors in accordance with the purpose of the expelled water, this duct being extended to near the bottom of said vessel. The aggregate is completed with a branch located approximately at midheight in said water discharge line, to which branch is connected a flexible tube open at its free end and jointed to a means capable of regulating at will the level at which said free end is fixed. For that purpose, suitable embodiment for said means consists in the incorporation of a rigid vertical bar which traverses the roof of the vessel and has a handle at its upper outer end, while the flexible tube is attached to it at the lower inner end by its tip.

The device being thus set up, when water comes in through the first conduit, whatever its pressure, the vessel will fill up to a maximum level determined by the float, at which moment the inflow will cease. As the solenoid valve opens in response to a control means associated, for example, with the temperature of the coffee being roasted, as well as by means of an appropriate programming device, or other suitable device the inflow of compressed air through the second upper conduit will begin. Such air cannot get into the water feed pipe because of the check valve provided on the latter. That air will inevitably cause the descent of the water level, inasmuch as it will be passing through the lower end of the discharge line to feed the ejectors or elements connected thereto. That effect will continue until the water level reaches the horizontal plane on which the free end of the flexible tube is located, at which time admission of air through said tube will take place and water circulation through the third conduit will be detained. That is to say, the amount of water which will have been ejected, fed through said third conduit, has been determined by the position of the free end of the flexible tube.

Obviously, to regulate or select certain quantities of water it will suffice to place said free end of the flexible tube at the proper levels. To facilitate that selection, the rod which maintains said tube may have an indicator such as a scale or the like.

To carry into effect the advantages thus summarily discussed, to which the users and specialists can add many more, and to facilitate the comprehension of the structural, constitutive and functional characteristics of the invented proportioner, a preferred embodiment is described below, which is illustrated schematically and without given scale on the attached sheet, with the express clarification that precisely because it is an example, it is not appropriate to assign to it a limitative or exclusive character of the scope of protection of the present invention, but it simply has a merely explanatory or illustrative intention of the basic concept on which the same is based.

BRIEF DESCRIPTION OF THE DRAWING

The FIGURE illustrated in said sheet represents a vertical section of the example of proportioner elected for the present elucidation of this invention.

DETAILED DESCRIPTION

As can be seen in this figure, the invented proportioner is formed by a vertically enlarged vessel (1), in the upper part of which, preferably in its roof (2) are located three vertical conduits (3), (4) and (5), the first of which is for the admission of water, the second for feeding compressed air from any suitable source, and the third is for the discharge of water at controlled quantity and pressure, intended to feed atomizer nozzles, not shown, and other ejectors, the details of which do not affect the invention.

It is a condition that the vessel (1) be hermetically sealed, and to that end it has such means as seals adjustable by threaded bolts (6).

The water feed line (3) has a return valve (7) of the kind adapted to prevent the rise of fluids through its interior (shown in schematic section). Said conduit (3) in turn is provided with a seal device (8) controlled by a float (9) of conventional type, so that the highest water level will not exceed plane (10). The compressed air feed line (4) has a solenoid valve (11) or any type of valve controllable as a function of the needs of water utilization; it may be associated with a programming device adapted to let the entrance of air occur exactly at the moment when ejection from the discharge conduit (5) must begin.

Said vertical conduit (5) has its open lower end (12) very near the bottom of the vessel (1) and it is through this opening that the water comes in which then goes to the atomizers. In the same conduit (5), in its middle region, a branch (13) is included, to which is coupled a flexible line (14) whose lower end is open and joined to a vertical rod (15) which passes through a hermetic packing (16) located in the roof of the vessel, ending in a handle (17) adapted to select manually and at will the depth at which the open lower end of said flexible tube is fixed.

When valve (11) opens and compressed air enters through conduit (4), the upper level (10) of the water begins to descend and the displaced liquid rises through the discharge conduit (5) to feed the ejectors or other nozzles associated with the device. This descent of the water continues until the lower level (18) defined by the open end of the flexible tube is reached, as the air above the water level begins to penetrate into said tube and the thrust onto the water disappears. It means that the volume of water which can have discharged through conduit (5) is that which corresponds to the level difference between the planes (10) and (18).

If the vertical rod (15) is placed in another position by acting on the handle (17), the lower level (18) is changed and hence the quantity of water impelled in each process.

In carrying into effect the proportioner thus described and exemplified, modifications and/or improvements can be introduced, all of which must be considered as variants of realization comprised within the ambit of the scope of protection of the present invention, which scope is determined, basically, by the text of the following claims.

I claim:

1. A proportioner for liquids comprising a hermetically sealed vessel; a liquid feed line, a compressed air line and a liquid discharge line, all of said lines entering through the top of said vessel, said liquid discharge line extending almost to the bottom of said vessel; a check valve and a valve closed by a float, both of said valves located in said liquid feed line for controlling the amount of liquid feed; a solenoid valve in said compressed air line for controlling the input of compressed air; a branch located at mid-height in said liquid discharge line; a flexible tube connected to said branch at its one end; a rod extending through the roof of said vessel and attached to the other open end of said flexible tube, said rod being adapted to be slidably moved in a vertical direction thereby controlling the level of said open end of the flexible tube and determining the amount of liquid to be discharged through said liquid discharge line.

2. The proportioner of claim 1 wherein said vessel is enlarged in the vertical direction and said rod is provided with an external handle.

* * * * *